US011064431B2

(12) United States Patent
 Calvarese et al.

(10) Patent No.: US 11,064,431 B2
(45) Date of Patent: Jul. 13, 2021

(54) ARRANGEMENT FOR, AND METHOD OF, ACCURATELY LOCATING, AND REDUCING ELECTRICAL POWER CONSUMPTION OF, MOBILE DEVICES AT REST IN A VENUE

(71) Applicant: SYMBOL TECHNOLOGIES, LLC, Lincolnshire, IL (US)

(72) Inventors: Russell E. Calvarese, Stony Brook, NY (US); Richard J. Lavery, Huntington, NY (US); Charles Lauria, Miller Place, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 868 days.

(21) Appl. No.: 15/139,420

(22) Filed: Apr. 27, 2016

(65) Prior Publication Data
US 2017/0318531 A1    Nov. 2, 2017

(51) Int. Cl.
H04W 52/02      (2009.01)
G08C 23/02      (2006.01)
H04W 64/00      (2009.01)
H04Q 9/00       (2006.01)
G08C 21/00      (2006.01)

(52) U.S. Cl.
CPC ........ *H04W 52/0212* (2013.01); *G08C 21/00* (2013.01); *G08C 23/02* (2013.01); *H04Q 9/00* (2013.01); *H04W 52/0254* (2013.01); *H04W 64/003* (2013.01); *G08C 2201/91* (2013.01); *G08C 2201/93* (2013.01); *H04Q 2209/47* (2013.01); *H04Q 2209/50* (2013.01); *H04Q 2209/883* (2013.01); *H04W 64/00* (2013.01); *Y02D 30/70* (2020.08)

(58) Field of Classification Search
CPC .................................. G08C 2201/12
USPC ............... 340/3.6, 3.63, 539.3, 693.3, 7.32
See application file for complete search history.

(56) References Cited

U.S. PATENT DOCUMENTS

| 5,790,536 | A  | * | 8/1998  | Mahany ............ B60R 16/0231 |
|           |    |   |         |                         235/462.15 |
| 5,949,776 | A  | * | 9/1999  | Mahany ............ G06K 7/10702 |
|           |    |   |         |                         370/311 |
| 7,633,389 | B2 | * | 12/2009 | Mantovani ......... G08B 21/0202 |
|           |    |   |         |                         340/539.13 |
| 7,639,131 | B2 | * | 12/2009 | Mock .................. G01S 5/0205 |
|           |    |   |         |                         340/539.11 |
| 7,761,233 | B2 |   | 7/2010  | Schott et al. |
| 9,389,085 | B2 | * | 7/2016  | Khorashadi ............ G01C 21/20 |
| 2012/0019674 | A1 | * | 1/2012  | Ohnishi ................. G08C 17/00 |
|           |    |   |         |                         348/207.1 |
| 2014/0266708 | A1 | * | 9/2014  | Warren ............. G08B 21/0272 |
|           |    |   |         |                         340/539.13 |

(Continued)

*Primary Examiner* — Carlos Garcia
(74) *Attorney, Agent, or Firm* — Yuri Astvatsaturov

(57) ABSTRACT

A sensing system generates location signals indicative of where an electrically-powered, mobile device is in a venue. A control system determines that the mobile device is at rest when the location signals are substantially the same for a predetermined period of time, processes the location signals to determine an accurate, current location of the mobile device in the venue when the mobile device is determined to be at rest, and controls the mobile device when determined to be at rest to operate in a low power mode in which the average electrical power consumption of the mobile device is reduced.

18 Claims, 5 Drawing Sheets

(56) References Cited

U.S. PATENT DOCUMENTS

2015/0010167 A1* 1/2015 Arling .............. H04N 21/42226
                                                    381/105
2016/0054847 A1* 2/2016 Sugimoto ................ G09G 3/36
                                                    345/173
2016/0098921 A1* 4/2016 Qutub ................... G06F 1/3206
                                                    367/197

* cited by examiner

ARRANGEMENT FOR, AND METHOD OF, ACCURATELY LOCATING, AND REDUCING ELECTRICAL POWER CONSUMPTION OF, MOBILE DEVICES AT REST IN A VENUE

BACKGROUND OF THE INVENTION

The present disclosure relates generally to an arrangement for, and a method of, accurately locating, and reducing average electrical power consumption of, an electrically-powered, mobile device, such as a portable data capture device, when at rest in a venue, such as a retail store.

Many different types of electrically-powered, mobile devices, such as handheld data capture readers, smartphones, tablets, computers, smartwatches, or like electronic devices, are held or worn, and operated, by human operators in various venues, such as retail stores, factories, warehouses, distribution centers, buildings, or like controlled indoor and outdoor areas. For example, one type of mobile data capture device can be a handheld, radio frequency (RF) identification (RFID) tag reader for reading RFID tags associated with products located in the venue. Another type of mobile data capture device can be a handheld, bar code symbol reader, either moving laser beam-based or imager-based, for electro-optically reading bar code symbols associated with the products. Still another type of mobile data capture device can be a handheld terminal or computer, such as a smartphone with an onboard camera for capturing images of various targets, such as bar code symbols, products, or operators. In operation, such electronic mobile devices are electrically powered by an onboard battery, and are operated to perform their data capture functions, typically while being held in one of the operator's hands.

Although generally satisfactory for their intended purpose, the operators may, from time to time, lay their mobile devices down on a nearby support surface or stand to take a break, or to free their hands to perform tasks other than data capture, such as retrieving products from storage, or attending to some paperwork, etc. Such mobile devices are still consuming power when at rest, thereby draining the battery and shortening the working lifetime of the mobile device. Such battery draining continues while the mobile devices are at rest when the mobile devices are cooperating with real-time locationing systems that are deployed in the venue to locate and to track the mobile devices, typically by using techniques known in the art that incorporate triangulation, trilateration, multilateration, and like locationing techniques. In some cases, the operators may switch the mobile devices completely off when laying the mobile devices down, but then the locationing systems will not immediately know the last known locations of the mobile devices when the operators pick up the mobile devices, and switch the mobile devices back on.

Accordingly, it would be desirable to more accurately locate and track such mobile devices when at rest in the venue, to reduce the average electrical power consumption of such mobile devices when at rest in a venue, and to immediately know the last known locations of the mobile devices when they are picked up and put back into service.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
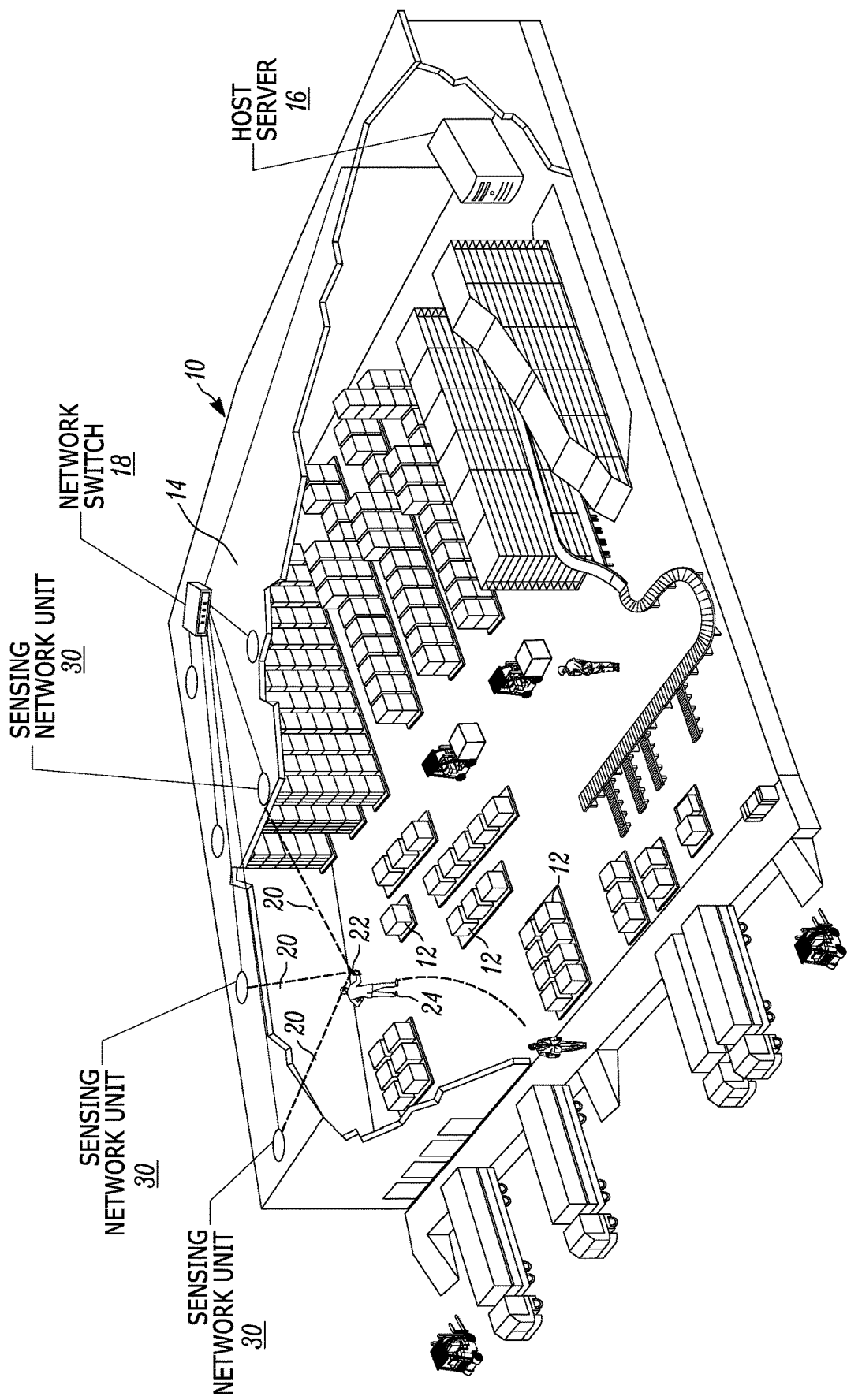
FIG. 1 is a broken-away, perspective view, as seen from above, of an arrangement for locating a mobile data capture device that is movable in a venue, such as a warehouse, in which multiple, overhead, sensing network units are deployed to locate the mobile device by triangulation.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for accurately locating, and for reducing the average electrical power consumption of, an electrically-powered, mobile device at rest in a venue. The mobile device can be any handheld data capture reader, smartphone, tablet, computer, smartwatch, or like electronic device. The venue can be any environment, such as a retail store, a factory, a warehouse, a distribution center, a building, or a like indoor or outdoor controlled area. The arrangement includes a sensing system for generating location signals indicative of where the mobile device is in the venue, and a control system operatively connected to the sensing system for determining that the mobile device is at rest when the location signals are substantially the same for a predetermined period of time, for processing the location signals to determine an accurate, current location of the mobile device in the venue when the mobile device is determined to be at rest, and for controlling the mobile device when determined to be at rest to operate in a low power mode in which the average electrical power consumption of the mobile device is reduced.

In one embodiment, the sensing system may include a motion sensor, such as an accelerometer, supported by the mobile device and operative to determine if the mobile device is at rest. In another embodiment, the sensing system may include a locationing system deployed in the venue and operative to determine if the mobile device is at rest. The locationing system may advantageously be an ultrasonic locationing system having a plurality of ultrasonic transmitters mounted in the venue remotely from the mobile device for transmitting a plurality of ultrasonic ranging signals, and an ultrasonic receiver supported by the mobile device for receiving the ultrasonic ranging signals, in which case, the control system determines that the mobile device is at rest when the received ultrasonic ranging signals are substantially the same for the predetermined period of time. The locationing system may also advantageously be a video system having a camera mounted in the venue remotely from the mobile device for capturing images of the mobile device, in which case, the control system determines that the mobile device is at rest when the captured images are substantially the same for the predetermined period of time.

The control system processes the location signals when the location signals are different to determine a general location of the mobile device in a tracking mode of operation, and switches to a different mode of operation in which the current location of the mobile device at rest is more accurately determined when the location signals are substantially the same. An accessible memory stores the current location of the mobile device at rest, and the stored current location of the mobile device at rest is retrievable from the memory when the control system determines that the mobile device is no longer at rest. The control system periodically controls the mobile device to stop processing the location signals during a shutdown time to reduce the average electrical power consumption, and to resume processing the location signals during a wake-up time. The control system also reduces electrical power to the mobile device at rest to prevent any data from being captured in the low power mode.

Another aspect of this disclosure relates to a method of accurately locating, and of reducing the average electrical power consumption of, an electrically-powered, mobile device at rest in a venue. The method is performed by generating location signals indicative of where the mobile device is in the venue, by determining that the mobile device is at rest when the location signals are substantially the same for a predetermined period of time, by processing the location signals to determine an accurate, current location of the mobile device in the venue when the mobile device is determined to be at rest, and by controlling the mobile device when determined to be at rest to operate in a low power mode in which the average electrical power consumption of the mobile device is reduced.

In accordance with this disclosure, the mobile device is more accurately located when at rest in the venue, and the current or last known location of the mobile device when it is no longer at rest is immediately known and available to the arrangement in order to continue tracking the mobile device during its further movement in the venue. Also, the average electrical power consumption of the mobile device is reduced when the mobile device is determined to be at rest in the venue. This conserves the battery, minimizes the battery drain, and prolongs the working lifetime of the mobile device.

Figure 2:
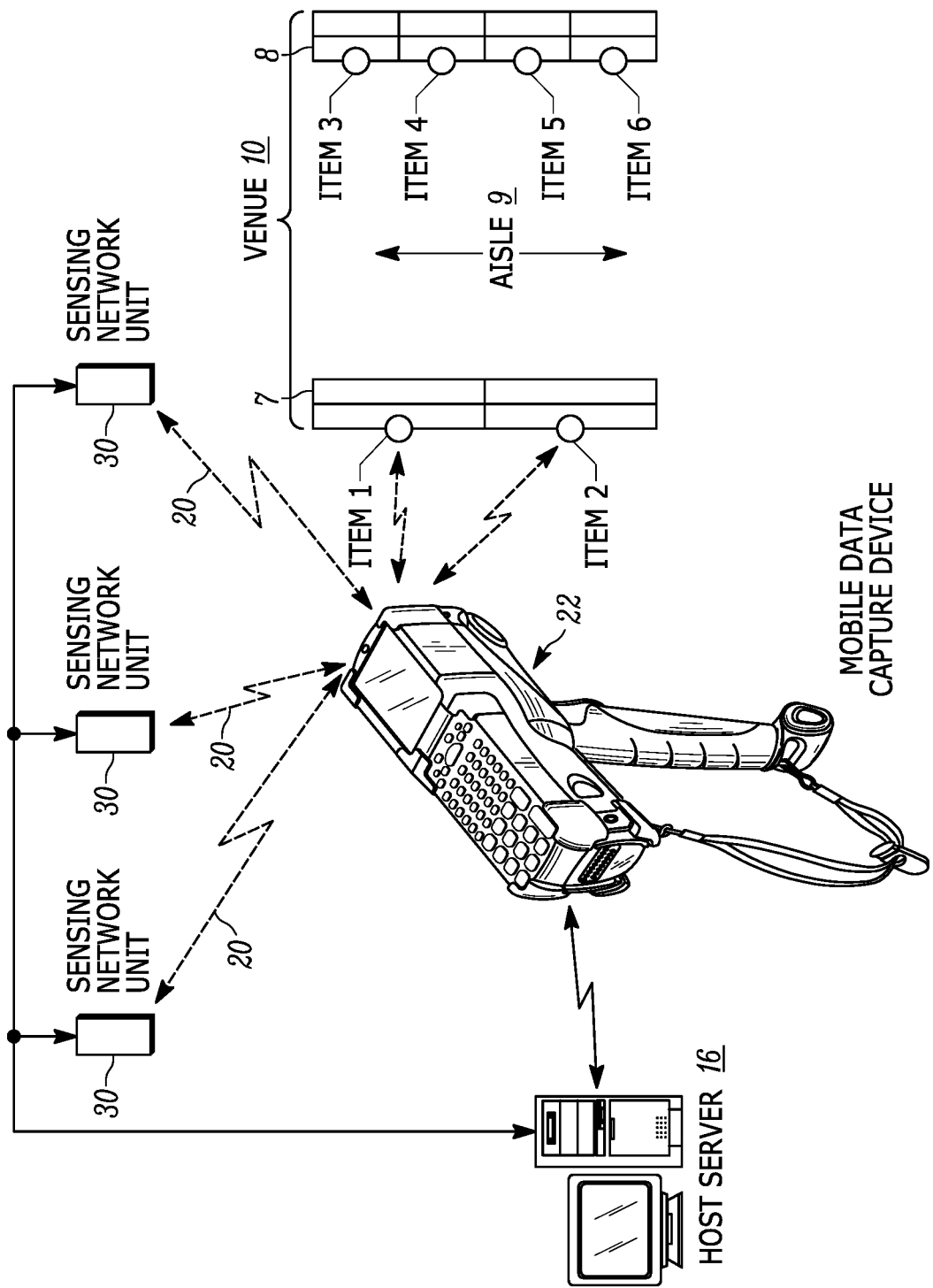
FIG. 2 is a simplified, pictorial diagram of an arrangement of the general type shown in FIG. 1, for accurately locating, and reducing the average electrical power consumption of, the mobile device when at rest in the venue, in accordance with the present disclosure.

Turning now to the drawings, reference numeral 10 in FIG. 1 generally depicts a venue in which a mobile device 22, shown in FIGS. 1-2 as a handheld, data capture device 22, is to be accurately located in accordance with this disclosure. The venue 10 is shown as a warehouse in FIG. 1, but can be any environment, such as a retail store, a factory, a distribution center, a building, or a like indoor or outdoor controlled area. The mobile device 22 is held or worn by, is operated by, and is jointly movable with, an operator 24, e.g., any person, employee, user, or associate authorized to operate the mobile reader 22. As shown, the mobile device 22 is configured as a handheld, data capture reader, which is operated to capture data from products 12, shown in FIG. 1 as cuboid cartons for simplicity. Knowing the location of the mobile device 22 is, in turn, indicative of knowing the location of the products 12. The mobile data capture reader 22 may be configured as a radio frequency (RF) identification (RFID) tag reader for reading RFID tags associated with, or attached to, the products 12, or a bar code symbol reader for reading bar code symbols associated with, or attached to, the products 12. The mobile device 22 can also be any smartphone, tablet, computer, terminal, smartwatch, or like portable electronic device, especially with an onboard camera for capturing images of various targets, such as bar code symbols, products 12, or operators 24. In operation, such electronic mobile devices 10 are electrically powered by an onboard battery 44 (see FIG. 4), and are operated to perform their various functions, such as data capture, typically while being held in one of the operator's hands.

As described below, a plurality of sensing network units 30 is mounted overhead, for example, on or below a ceiling 14. Advantageously, the sensing network units 30 can be installed every twenty to eighty feet or so in a square grid in the venue 10. As depicted in FIGS. 1-2, three of the sensing network units 30 can be used, as described below, to locate the mobile device 22, by triangulation or trilateration, as diagrammatically shown by dashed lines 20. A network computer or host server 16, typically locally located in a backroom at the venue 10, comprises one or more computers and is in wired, wireless, direct, or networked communication with each sensing network unit 30 through a network switch 18. The server 16 may also be remotely hosted in a cloud server. The server 16 may include a wireless RF transceiver that communicates with each sensing network unit 30. For example, Wireless Fidelity (Wi-Fi) and Bluetooth® are open wireless standards for exchanging data between electronic devices. The server 16 controls each sensing network unit 30.

As best seen in FIG. 2, when the mobile reader 22 is an RFID tag reader, each product 12 is preferably tagged with an RFID product tag, preferably a passive RFID tag for cost reasons, and, in some applications, each RFID product tag may be associated with a pallet or a container for multiple products 12. The venue 10 may have any layout or configuration. As also shown in FIG. 2, the venue 10 may have, for example, a plurality of shelving structures 7 and 8 separated by an aisle 9 in the venue 10, and a plurality of RFID-tagged items 1-2 can be mounted on the shelving structure 7, and a plurality of other RFID-tagged items 3-6 can be mounted on the shelving structure 8.

Figure 3:
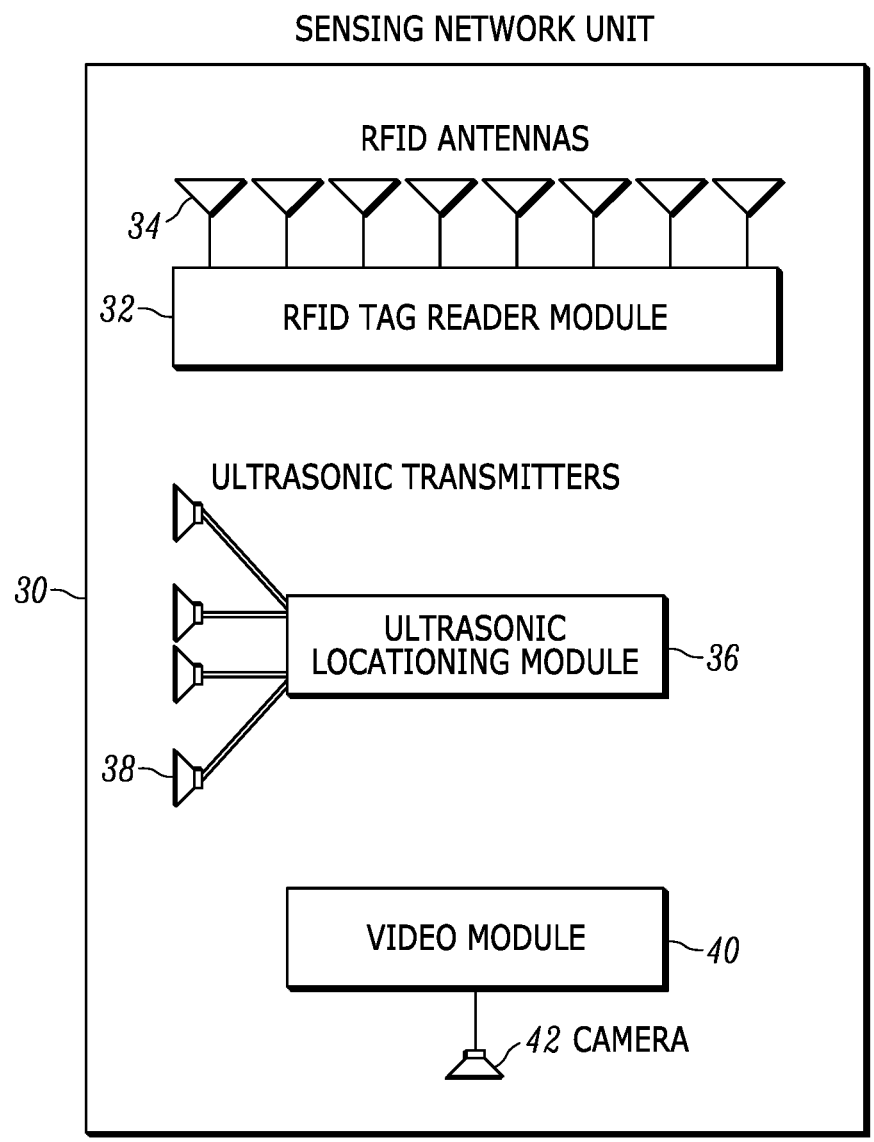
FIG. 3 is a simplified block diagram of various sensing systems that may be mounted in each sensing network unit of FIG. 1.

The block diagram of FIG. 3 depicts different sensing systems that can be mounted in each sensing network unit 30. One or more of these sensing systems can be operated to locate the mobile reader 22 and/or the products 12. For example, one sensing system is an RFID locationing system, which includes an RFID tag reader module 32 having control and processing electronics and an RF transceiver operatively connected to a plurality of RFID antennas 34. The RFID module 32 transmits an RF interrogation signal to the RFID antennas 34, which radiate an antenna field pattern in a read zone in which the mobile device 22 is located. A locationing receiver 46 (see FIG. 4) on the mobile device 22 receives and responds to the interrogation signal. Multiple sensing network units 30 locate the locationing receiver 46 and, in turn, the mobile device 22. One or more of the RFID-tagged items 1-6 are also contained in the read zone, thereby also interrogating the payloads of the RFID-tagged items 1-6. The RFID-tagged items 1-6 return an RF response signal to the RFID module 32 via the RFID antennas 34.

Each payload or captured target data from an RFID-tagged item identifies the RFID-tagged item, and multiple sensing network units 30 locate the RFID-tagged item.

Another sensing system is an ultrasonic locationing system operative for locating the mobile device 22. For example, the ultrasonic locationing system includes an ultrasonic locationing module 36 having control and processing electronics operatively connected to a plurality of ultrasonic transmitters, such as voice coil or piezoelectric speakers 38, for transmitting ultrasonic energy to an ultrasonic receiver or microphone 48 (see FIG. 4) on the mobile device 22. The receipt of the ultrasonic energy at the microphone 48 locates the mobile device 22. Each ultrasonic speaker 38 periodically transmits ultrasonic ranging signals, preferably in short bursts or ultrasonic pulses, which are received by the microphone 48. The microphone 48 determines when the ultrasonic ranging signals are received. The flight time difference between the transmit time that each ranging signal is transmitted and the receive time that each ranging signal is received, together with the known speed of each ranging signal, as well as the known and fixed locations and positions of the speakers 38 on each sensing unit 30, are all used to determine the position of the microphone 48 on the mobile device 22, using a suitable locationing technique, such as triangulation, trilateration, multilateration, etc.

Still another sensing system is a video locationing system operative for locating the mobile device 22, and/or the operator 24 operating the mobile device 22, and/or the product 12. The video locationing system includes a video module 40 having camera control and processing electronics that is connected to a camera 42 for capturing an image of the mobile device 22, and/or the operator 24, and/or the product 12. The camera 42 is advantageously a high-bandwidth, moving picture expert group (MPEG) compression camera. The capture of the image at the camera 42 is processed by the server 16 to locate the mobile device 22, and/or the user 24, and/or the product 12.

It will be understood that each sensing network unit 30 need not have all or some of the above-described locationing systems, and may include additional locationing systems, such as Wi-Fi or Bluetooth® locationing systems. In some embodiments, only one locationing system would suffice. In other embodiments, two or more of the locationing systems can cooperate with each other. In a preferred embodiment, the RFID locationing system is employed to sense the general location of the mobile device 22, and the ultrasonic locationing system and/or the video locationing system is employed to more accurately locate the mobile device 22.

Figure 4:
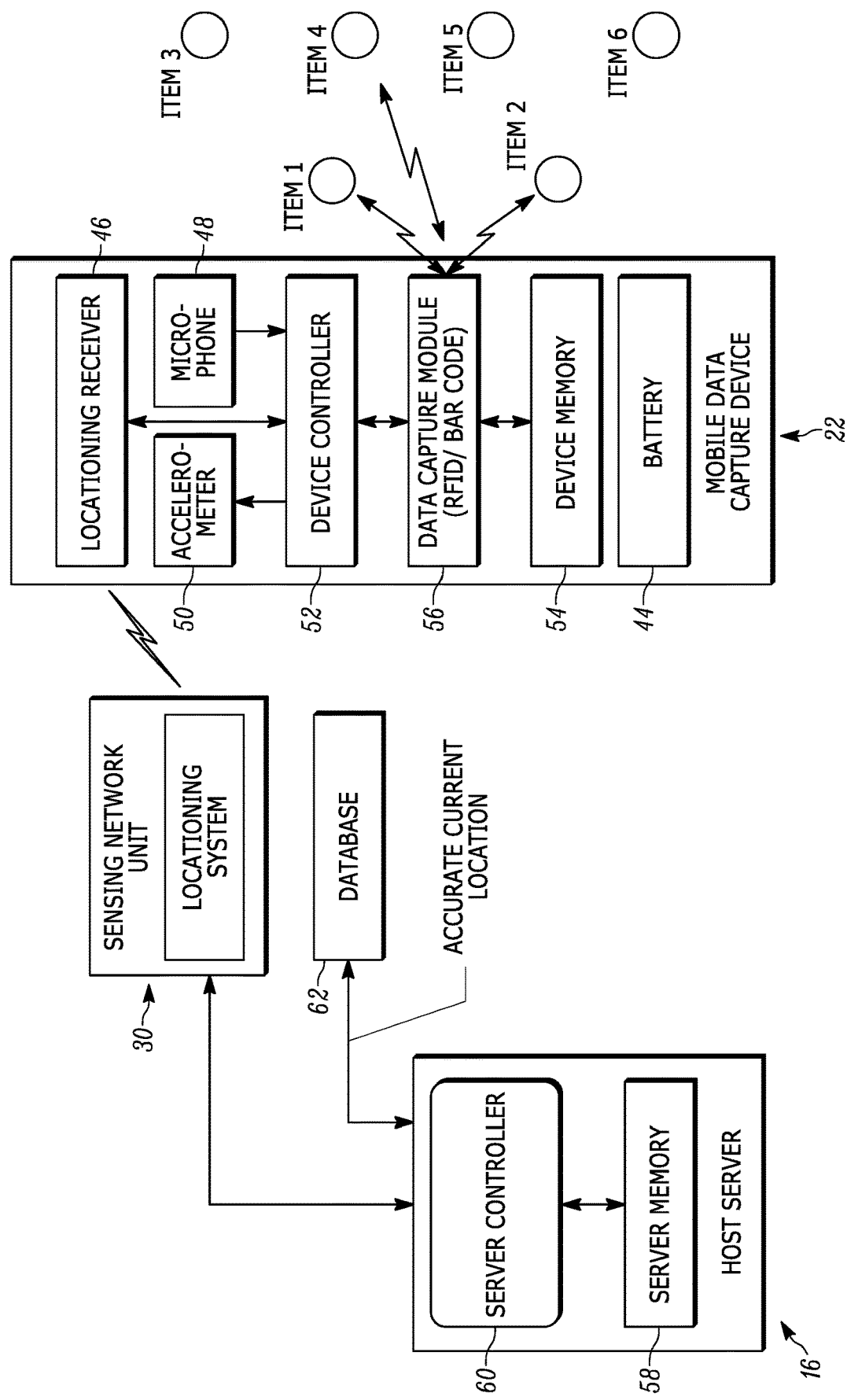
FIG. 4 is a simplified block diagram of the arrangement of FIG. 2.

As further shown in FIG. 4, the mobile device 22 has a data capture module 56, e.g., an RFID reader or a bar code reader, a programmed microprocessor or device controller 34 that controls all the electrical components in the mobile device 22, and a device memory 54 for storing data under the control of the device controller 52. The host server 16 also includes a programmed microprocessor or server controller 60 that controls all the electrical components in the arrangement, and a server memory 58 for storing data under control of the server controller 60.

As previously mentioned, the operator 24 may, from time to time, lay the mobile device 22 down on a nearby support surface or stand to take a break, or to free his/her hands to perform tasks other than data capture, such as retrieving products 12 from storage, or attending to some paperwork, etc. The mobile device 22 is still consuming power when at rest, thereby draining the battery 44 and shortening the working lifetime of the mobile device 22. Such battery draining continues while the mobile device 22 is at rest when the mobile device 22 is cooperating with the real-time locationing systems in the sensing network units 30 that are deployed in the venue 10 to locate and to track the mobile device 22. In some cases, the operator 24 may switch the mobile device 22 completely off when laying the mobile device 22 down, but then the locationing systems will not immediately know the last known locations of the mobile device 22 when the operator 24 picks up the mobile device 22, and switches the mobile device 22 back on.

In accordance with this disclosure, an arrangement is provided for accurately locating the mobile device 22, and for thereafter reducing the average electrical power consumption of the mobile device 22 while at rest in the venue 10. The arrangement includes a sensing system for generating location signals indicative of where the mobile device 22 is in the venue 10, and a control system operatively connected to the sensing system for determining that the mobile device 22 is at rest when the location signals are substantially the same for a predetermined period of time.

More particularly, the sensing system may include a motion sensor, such as an accelerometer 50 (see FIG. 4), which is supported by the mobile device 22, and which is operative to determine if the mobile device is at rest. Preferably, the accelerometer 50 can detect motion of the mobile device along any one or more of three mutually orthogonal axes, and is connected to the device controller 52 onboard the mobile device 22. The device controller 52 and/or the server controller 60, which together comprise the control system, analyze signals received from the accelerometer 50 and determine that the mobile device 22 is at rest or at a standstill when these signals are substantially the same for a predetermined period of time, e.g., one minute.

The sensing system may include one or more of the aforementioned locationing systems that are deployed in the venue 10. For example, the device controller 52 and/or the server controller 60 analyze the ultrasonic ranging signals received from the microphone 48 and determine that the mobile device 22 is at rest or at a standstill when these received ultrasonic ranging signals are substantially the same for a predetermined period of time. As another example, the device controller 52 and/or the server controller 60 analyze the images captured by the camera 42 and determine that the mobile device 22 is at rest or at a standstill when these captured images are substantially the same for a predetermined period of time. As yet another example, the device controller 52 and/or the server controller 60 analyze the location signals received from the locationing receiver 46 and determine that the mobile device 22 is at rest or at a standstill when these received location signals are substantially the same for a predetermined period of time.

In a normal or tracking mode of operation, the location signals are different, in which case, the control system knows that the mobile device is in motion. Once the control system has determined that the mobile device 22 is at rest, i.e, the location signals are substantially the same, the control system switches to a different mode of operation in which the current location of the mobile device at rest is more accurately determined. Thus, the control system modifies its methods used to determine location when the mobile device is determined to be at rest. For example, the control system may statistically analyze the received location signals, may be more selective, and may discard any outlier location signals that are not within a prescribed range, thereby minimizing noise. Or, the control system may analyze location signals from a plurality of the locationing systems and accept only a subset of those location signals that yield a consistent, repeatable result. Or, the control system may take an average of more input samples to determine the location of the mobile device when the mobile device is determined to be at rest. Put another way, the control system substitutes a different analytical model used to determine location when the mobile device is determined to be at rest. Normally, a probabilistic-based algorithm, such as the well known particle filter would take the input samples and generate the location of the mobile device. A probabilistic-based algorithm is often effective when the input samples contain much variance. When the mobile device is determined to be at rest, a direct trilateration, triangulation, or received signal strength indication (RSSI)-based approach may be more accurate when the input samples are more consistent with a known constant position of the mobile device.

The more accurate current location of the mobile device at rest is stored in the device memory 54 and/or the server memory 58. The host server 16 can also output this current location of the mobile device at rest to a remote database 62 for storage, display and/or further analysis. The control system accesses the device memory 54 and/or the server memory 58 and/or the database 62 to retrieve the stored current location of the mobile device at rest when the control system determines that the mobile device 22 is no longer at rest, i.e., when the location signals received from the sensing system are different and indicate that the mobile device 22 is in motion. This retrieval is immediate and, therefore, the highly accurate, current location or last known location of the mobile device 22 is immediately available to the arrangement in order to continue tracking the mobile device 22 during its further movement in the venue 10.

In addition, once the control system has determined that the mobile device 22 is at rest, the control system controls the mobile device 22 to operate in a low power mode in which the average electrical power consumption of the mobile device 22 is reduced. For example, one or more of the electrical components in the mobile device 22 can be either partially or fully deenergized at least for a time period. This minimizes drain of the battery 44.

Advantageously, the control system periodically controls the mobile device 22 to stop processing the location signals during a shutdown time to reduce the average electrical power consumption, and to resume processing the location signals during a wake-up time. The control system can also reduce electrical power to the mobile device 22 at rest to prevent the data from being captured by the data capture module 56 in the low power mode. For example, the control system can periodically wake up the mobile device 22 every ten seconds or so for a time of about ten milliseconds. This duty cycle conserves the energy supplied by the battery 44.

Figure 5:
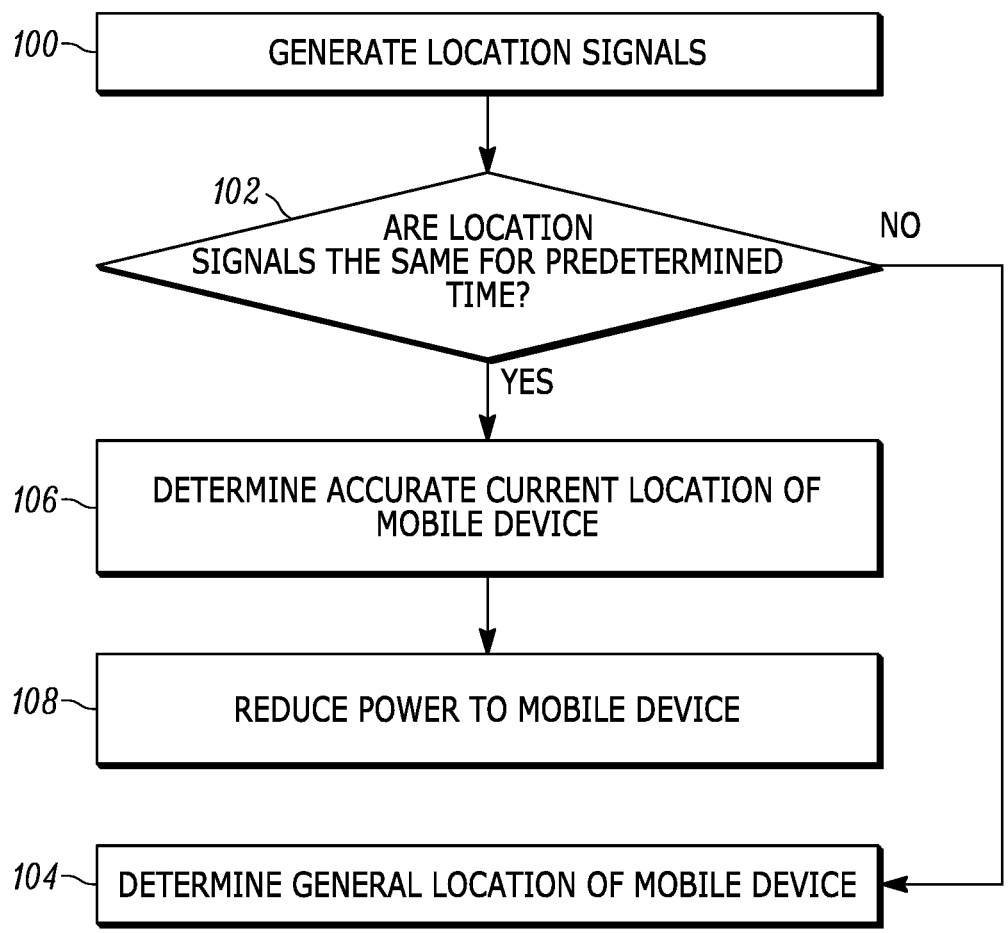
FIG. 5 is a flow chart depicting steps performed in accordance with the method of the present disclosure.

As shown in the flow chart of FIG. 5, in step 100, signals indicative of where the mobile device 22 is in the venue 10 are generated by the accelerometer 50, or by any one or more of the locationing systems in the sensing network unit 30. The control system analyzes these signals in step 102. If they are different, then this indicates that the mobile device 22 is in motion, and one or more of the locationing systems can determine the general location of the mobile device 22 in step 104 in a normal or tracking mode of operation. If the signals are substantially the same for a predetermined period of time, then that indicates that the mobile device 22 is at rest, and the control system can then switch to a different mode of operation and further process the signals to determine a more accurate, current location of the mobile device 22 in step 106, and can then set the mobile device 22 to operate in a low power mode in step 108.

In the foregoing specification, specific embodiments have been described. However, one of ordinary skill in the art appreciates that various modifications and changes can be made without departing from the scope of the invention as set forth in the claims below. For example, a Wi-Fi or Bluetooth® or RF locationing system can also be utilized with the locationing receiver 46 to locate the mobile device 22. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for accurately locating, and for reducing average electrical power consumption of, an electrically-powered, mobile device at rest in a venue, the arrangement comprising:
   a sensing system for generating location signals indicative of where the mobile device is in the venue, wherein the sensing system includes a locationing system deployed in the venue; and
   a control system operatively connected to the sensing system for determining that the mobile device is at rest when the location signals are substantially the same for a predetermined period of time, for processing the location signals to determine an accurate, current location of the mobile device in the venue when the mobile device is determined to be at rest, and for controlling the mobile device when determined to be at rest to operate in a low power mode in which the average electrical power consumption of the mobile device is reduced.

2. The arrangement of claim 1, wherein the sensing system further includes a motion sensor supported by the mobile device and operative to determine if the mobile device is at rest.

3. The arrangement of claim 1, wherein the locationing system is an ultrasonic locationing system having a plurality of ultrasonic transmitters mounted in the venue remotely from the mobile device for transmitting a plurality of ultrasonic ranging signals, and an ultrasonic receiver supported by the mobile device for receiving the ultrasonic ranging signals; and wherein the control system is operative for determining that the mobile device is at rest when the received ultrasonic ranging signals are substantially the same for the predetermined period of time.

4. The arrangement of claim 1, wherein the locationing system is a video system having a camera mounted in the venue remotely from the mobile device for capturing images of the mobile device; and wherein the control system is operative for determining that the mobile device is at rest when the images are substantially the same for the predetermined period of time.

5. The arrangement of claim 1, wherein the mobile device is one of a handheld radio frequency (RF) identification (RFID) tag reader for capturing data from RFID tags associated with products in the venue, a handheld bar code symbol reader for capturing data from bar code symbols associated with the products in the venue, and a mobile computer having a camera for capturing data from targets in the venue; and wherein the control system reduces electrical power to the mobile device at rest to prevent the data from being captured in the low power mode.

6. The arrangement of claim 1, wherein the control system controls the mobile device to operate in the low power mode after the accurate, current location of the mobile device is determined.

7. The arrangement of claim 1, wherein:
   when the location signals indicate that the mobile device is in motion, the control system processes the location signals to determine a general location of the mobile device in a tracking mode of operation, and
   when the location signals indicate that the mobile device is at rest, the control system switches to a different mode of operation in which the current location of the mobile device at rest is more accurately determined.

8. The arrangement of claim 7, wherein the control system includes an accessible memory for storing the current location of the mobile device at rest, and wherein the control system accesses the memory to retrieve the stored current location of the mobile device at rest when the control system determines that the mobile device is no longer at rest.

9. The arrangement of claim 7, wherein the control system periodically controls the mobile device to stop processing the location signals during a shutdown time to reduce the average electrical power consumption, and to resume processing the location signals during a wake-up time.

10. A method of accurately locating, and of reducing average electrical power consumption of, an electrically-powered, mobile device at rest in a venue, the method comprising:
    generating, via a sensing system including a locationing system deployed in the venue, location signals indicative of where the mobile device is in the venue;
    determining, via the sensing system and a control system operatively connected to the sensing system, that the mobile device is at rest when the location signals are substantially the same for a predetermined period of time;
    processing, via the control system, the location signals to determine an accurate, current location of the mobile device in the venue when the mobile device is determined to be at rest; and
    controlling, via the control system, the mobile device when deteimined to be at rest to operate in a low power mode in which the average electrical power consumption of the mobile device is reduced.

11. The method of claim 10, wherein at least one of the generating and the determining is performed further by a motion sensor onboard the mobile device.

12. The method of claim 10, wherein the determining that the mobile device is at rest is performed by determining when received ultrasonic ranging signals are substantially the same for the predetermined period of time.

13. The method of claim 10, wherein the determining that the mobile device is at rest is performed by determining when captured images of the mobile device are substantially the same for the predetermined period of time.

14. The method of claim 10, further comprising configuring the mobile device as one of a handheld radio frequency (RF) identification (RFID) tag reader for capturing data from RFID tags associated with products in the venue, a handheld bar code symbol reader for capturing data from bar code symbols associated with the products in the venue, and a mobile computer having a camera for capturing data from targets in the venue; and reducing electrical power to the mobile device at rest to prevent the data from being captured in the low power mode.

15. The method of claim 10, wherein the controlling of the mobile device to enter the low power mode is performed after the processing of the location signals.

16. The method of claim 10, further comprising:

when the location signals indicate that the mobile device is in motion, processing the location signals to determine a general location of the mobile device in a tracking mode of operation, and when the location signals indicate that the mobile device is at rest, switching to a different mode of operation in which the current location of the mobile device at rest is more accurately determined.

17. The method of claim 16, further comprising storing the current location of the mobile device at rest, and retrieving the stored current location of the mobile device at rest upon the determination that the mobile device is no longer at rest.

18. The method of claim 16, further comprising periodically controlling the mobile device to stop processing the location signals during a shutdown time to reduce the average electrical power consumption, and to resume processing the location signals during a wake-up time.

\* \* \* \* \*